Figure 1:
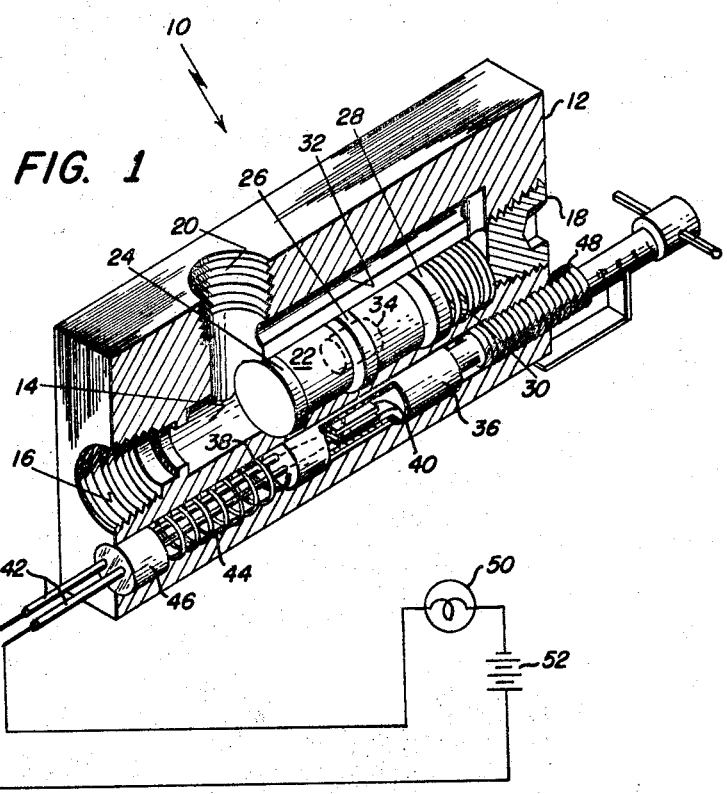

Oct. 9, 1962   J. R. CASWELL   3,057,977
FLOW SWITCHES
Filed Nov. 27, 1959

INVENTOR
JOHN R. CASWELL
BY  *H. Vincent Harsha*
ATTORNEY

United States Patent Office 3,057,977
Patented Oct. 9, 1962

3,057,977
FLOW SWITCHES
John R. Caswell, Lincoln, Mass., assignor to Raytheon
Company, Waltham, Mass., a corporation of Delaware
Filed Nov. 27, 1959, Ser. No. 855,800
8 Claims. (Cl. 200—81.9)

This invention relates to flow switches and more particularly to flow switches of the type which are adapted to monitor the rate of flow of a fluid past a point and to open or close an electrical circuit in response to a predetermined rate of flow of said fluid.

In applications in which it is desirable to actuate an electrical switch in response to a monitored rate of flow of a fluid, flow switches frequently utilize rotating elements such as paddles, turbines or moving vanes positioned in the fluid in order to mechanically actuate an electrical switch forming part of an indicating or control circuit. These rotating elements, however, sometimes monitor only a portion of the fluid or liquid flow due to the addition of by-pass paths which by-pass the remaining flow around the rotating element. Additionally, a blockage in the by-pass path of this type of flow switch can prevent the obtaining of a correct indication of the flow. Moreover, when an electrical switch is mechanically actuated by the aforementioned elements positioned in the fluid flow, it becomes necessary to provide a seal between the fluid and the electrical circuit. To overcome these difficulties, electrical contacts are adapted to become actuated in response to a magnetic field, such as provided by the proximity of a permanent magnet carried by a flow-actuated bobbin moveable within the cylinder of the flow switch. However, a flow switch of this type is capable of indicating only a single preset rate of flow. It is therefore, an object of the invention to provide an improved flow switch which is capable of being adjusted to indicate any rate of total flow within broad limits and at the same time to provide isolation between the fluid in the flow switch cylinder and the external electrical circuit used in such indication.

In accordance with the flow switch of the invention, a hollow cylinder is closed at one end and is provided with a fluid inlet or input port at the other end. An output port extends laterally from the cylinder. A cylindrical bobbin is slidably inserted within the cylinder and spring loaded to oppose the flow of fluid into the input port. The displacement of the bobbin within the cylinder is used to measure the rate of flow from input port to output port. A by-pass passage is provided from the closed end of the cylinder to the fluid input port to insure that the bobbin is free to move along the cylinder and does not impede the flow rate due to back pressure on the bobbin. A magnetic field producing means such as a permanent magnet is positioned within the bobbin and adapted to provide a relatively confined magnetic field. An electrical switch element is provided with a pair of metallic contacts adapted to close in the presence of the magnetic field. The switch element is positioned within a cylinder extending parallel to the axis of the bobbin cylinder and displaced radially so as to be within the magnetic field of the bobbin magnet as the bobbin travels within the bobbin cylinder in response to fluid flow. The position of the electrical switch element within its cylinder is determined by a calibrated adjusting screw which urges the switch element against a loading spring. This action brings the magnetic actuated contacts of the electrical switch element into or out of proximity with the magnetic field produced by the bobbin magnet. In this manner, the position of the switch element can be adjusted to be actuated by a single desired rate of flow which is proportional to a particular distance of bobbin travel. The invention further contemplates multiple electrical switch elements all of which are set for different flow rates actuated by the same bobbin, the limit being only the physical size of the switch elements required to house the magnetic contacts at the proper distance from the bobbin.

Figure 2:
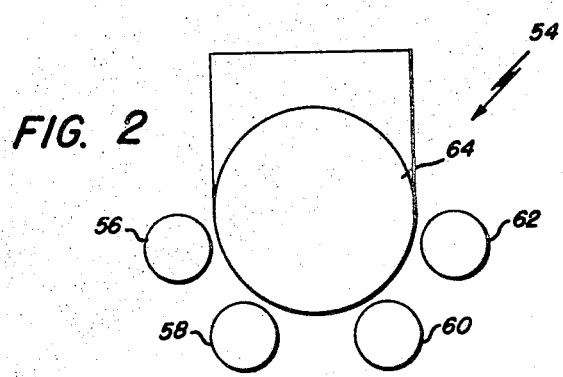

The features of the novel flow switch together with its manner of construction will be more readily comprehended by reference to the following description, when considered in conjunction with the attached drawing in which:

FIG. 1 is an isometric view of the flow switch; and
FIG. 2 is a diagrammatic representation of a flow switch provided with multiple electrical switch elements positioned around the bobbin cylinder.

Referring to FIGS. 1 and 2, the flow switch of the present invention may be cylindrical or have other suitable cross section as long as the elements of the device may be telescoped with reference to each other. Referring in particular to FIG. 1, a flow switch 10 comprises a switch housing 12 which is preferably a brass block drilled to provide a bobbin cylinder 14 provided with a threaded input port 16 for connection to a source of fluid. The other end of the cylinder is closed by a threaded plug 18. Extending laterally from the cylinder 14 is an output port 20. A cylindrical bobbin 22 is provided with bobbin rings 24, 26 and 28 and is slidably inserted within the cylinder. The bobbin rings or baffles minimize the leakage of fluid into the closed end of the cylinder. The bobbin is spring loaded by means of a loading spring 30 and is urged to move in a direction opposite to the fluid flow from the input port 16. By-pass 32 communicates with the closed end of the cylinder and the output port so that, during displacement of the bobbin, fluid is not compressed in the area of the loading spring in a manner so as to oppose the displacement of the bobbin. The bobbin, therefore, is displaced a distance proportional to the fluid flow and does not impede the fluid flow.

The bobbin 22 is preferably made of brass or other non-magnetic material and is drilled to receive a permanent magnet 34. This magnet provides a magnetic field which changes position with the longitudinal displacement of the bobbin within the cylinder 14. An electrical switch element 36 is positioned within a cylinder 38 extending parallel to the bobbin cylinder. A pair of metallic contacts 40 are supported within switch element 36 and are adapted to open or close in response to the application of a magnetic field from the magnet 34. The contacts of the switch are, for example, made of two parallel extending sheets of ferrous material tempered to provide sufficient spring tension to be held apart in the absence of a magnetic field. When the field of magnet 34 is brought into proximity with the switch, the contacts close and complete an electrical circuit to indicate a particular fluid flow. The contacts within the switch element are connected to two lead-in wires 42. These wires extend through a loading spring 44 which is held in place within the cylinder by means of a plastic cap 46. This cap is provided with two apertures, as shown, to permit passage for the contact wires such that they do not bind as the switch element is moved in the cylinder. The position of the switch in the cylinder is determined by a calibrated adjusting screw 48 which applies force to one end of the switch element 36 and moves the switch contacts into proximity of the magnetic field. In this manner, the contacts are positioned at different distances along the cylinder 44 and become actuated by different rates of flow. For example, when the contacts are closed, an indicator light 50 is connected in series with battery source 52 and becomes illuminated to indicate the particular flow rate corresponding to the setting on the calibrated screw 48.

Referring to FIG. 2, there is shown a flow switch 54 which includes a plurality of electrical switch elements 56, 58, 60 and 62 positioned at different intervals along the longitudinal axis of a bobbin cylinder 64. These elements simultaneously monitor several different rates of flow in response to the displacement of a single bobbin. For example, it is possible to measure the high and low limit of bobbin travel so as to keep the flow rate between two specified limits.

It is to be understood that the above-described arrangements are illustrative of the application of the principles of the invention. Numerous other arrangements may be devised by those skilled in the art without departing from the spirit and scope of the invention. Accordingly, it is desired that the invention not be limited to the particular details of the embodiments disclosed herein except as defined in the appended claims.

What is claimed is:

1. A flow switch comprising a cylinder having a fluid inlet passage and a lateral outlet passage interconnected with said fluid inlet passage, a flow bobbin slidably supported in said cylinder, said bobbin adapted to move so as to provide an increase in area of fluid passage in response to an increase in fluid pressure, magnetic field producing means adapted to move in said cylinder within said bobbin in the area of fluid flow, and switching means moveable with respect to the travel of said bobbin actuated by said magnetic field producing means to indicate a plurality of positions of said bobbin within said cylinder.

2. A flow switch comprising a cylinder having a fluid inlet passage and a lateral outlet passage interconnected with said fluid inlet passage, a flow bobbin slidably supported in said cylinder, means to insure that the back pressure on said bobbin does not impede the flow rate of fluid entering said cylinder, a magnet positioned within said bobbin and isolated from fluid flow, and moveable switch means responsive to the magnetic field produced by said magnet to indicate a plurality of positions of said bobbin within said cylinder.

3. A flow switch comprising a cylinder closed at one end, a lateral outlet port interconnected with said cylinder, a flow bobbin slidably supported in said cylinder, means to insure that the back pressure on said bobbin does not impede the flow rate of fluid entering said cylinder, spring loading means for opposing the travel of said flow bobbin in response to fluid entering said cylinder, magnetic field producing means sealed within said flow bobbin for providing a magnetic field which moves with said bobbin, and a plurality of means adjustably positioned with respect to said bobbin for indicating the extent of travel of said bobbin in response to said magnetic field.

4. A flow switch comprising a cylinder closed at one end, a lateral outlet port interconnected with said cylinder, a flow bobbin slidably supported in said cylinder, said bobbin adapted to move so as to provide an increase in area of fluid passage in response to an increase in fluid pressure, spring loading means for opposing the travel of said flow bobbin in response to fluid entering said cylinder, magnetic field producing means mounted within said flow bobbin for providing a magnetic field which moves with said bobbin, and a plurality of indicating means adapted to respond to the magnetic field producing means, said indicating means adjustably positioned along the path of the bobbin travel to indicate a plurality of individual flow rates in response to bobbin displacement.

5. A flow switch comprising a cylinder closed at one end, a lateral outlet port interconnected with said cylinder, a flow bobbin slidably supported in said cylinder, spring loading means for opposing the travel of said flow bobbin in response to fluid entering said cylinder, a bypass path communicating the outlet port of said cylinder with the closed end of said cylinder, magnetic field producing means connected to said flow bobbin for providing a magnetic field which moves with said bobbin, and a plurality of indicating means adapted to respond to the magnetic field producing means, said indicating means adjustably positioned along the path of the bobbin travel to indicate a plurality of individual flow rates in response to bobbin displacement.

6. A flow switch comprising a cylinder closed at one end, a lateral outlet port interconnected with said cylinder, a flow bobbin slidably supported in said cylinder, said bobbin adapted to move so as to provide an increase in area of fluid passage in response to an increase in fluid pressure, means to insure that the back pressure on said bobbin does not impede the flow rate of fluid entering said cylinder, spring loading means for opposing the travel of said flow bobbin in response to the total flow of fluid entering said flow switch, magnetic field producing means sealed within said flow bobbin for providing a magnetic field which moves with said bobbin, and calibration means adjustably positioned with respect to said bobbin for indicating the extent of travel of said bobbin in response to said magnetic field.

7. In combination, a cylinder closed at one end, a lateral outlet port interconnected with said cylinder, a flow bobbin slidably supported in said cylinder, spring loading means for opposing the travel of said flow bobbin in response to fluid entering said cylinder, said bobbin adapted to move so as to provide an increase in area of fluid passage in response to an increase in fluid pressure, magnetic field producing means enclosed within said flow bobbin for providing a magnetic field which moves with said bobbin, and indicating means adapted to respond to the magnetic field producing means, said indicating means adapted to be calibrated along the path of the bobbin travel to indicate a flow rate in response to bobbin displacement.

8. A flow sensing device comprising a cylinder closed at one end, an outlet port interconnected with said cylinder, a flow bobbin slidably supported in said cylinder, spring loading means for opposing the travel of said flow bobbin in response to fluid entering said cylinder, means to insure that the back pressure on said bobbin does not impede the flow rate of fluid entering said cylinder, comprising by-pass passage means, magnetic means within said bobbin, indicating means adapted to respond to said magnetic means, and means for adjustably calibrating said indicating means along the path of the bobbin travel to indicate a flow rate in response to displacement of said magnetic means.

References Cited in the file of this patent

UNITED STATES PATENTS

| | | |
|---|---|---|
| 2,310,504 | Aubert | Feb. 9, 1943 |
| 2,419,942 | Brewer | May 6, 1947 |
| 2,628,297 | Grauer | Feb. 10, 1953 |
| 2,772,409 | Reid | Nov. 27, 1956 |
| 2,791,657 | Bloxsom et al. | May 7, 1957 |
| 2,862,076 | Bonner | Nov. 25, 1958 |
| 2,963,563 | Patterson | Dec. 6, 1960 |